(No Model.)
J. O. FORD.
CULTIVATOR.
No. 535,690. Patented Mar. 12, 1895.
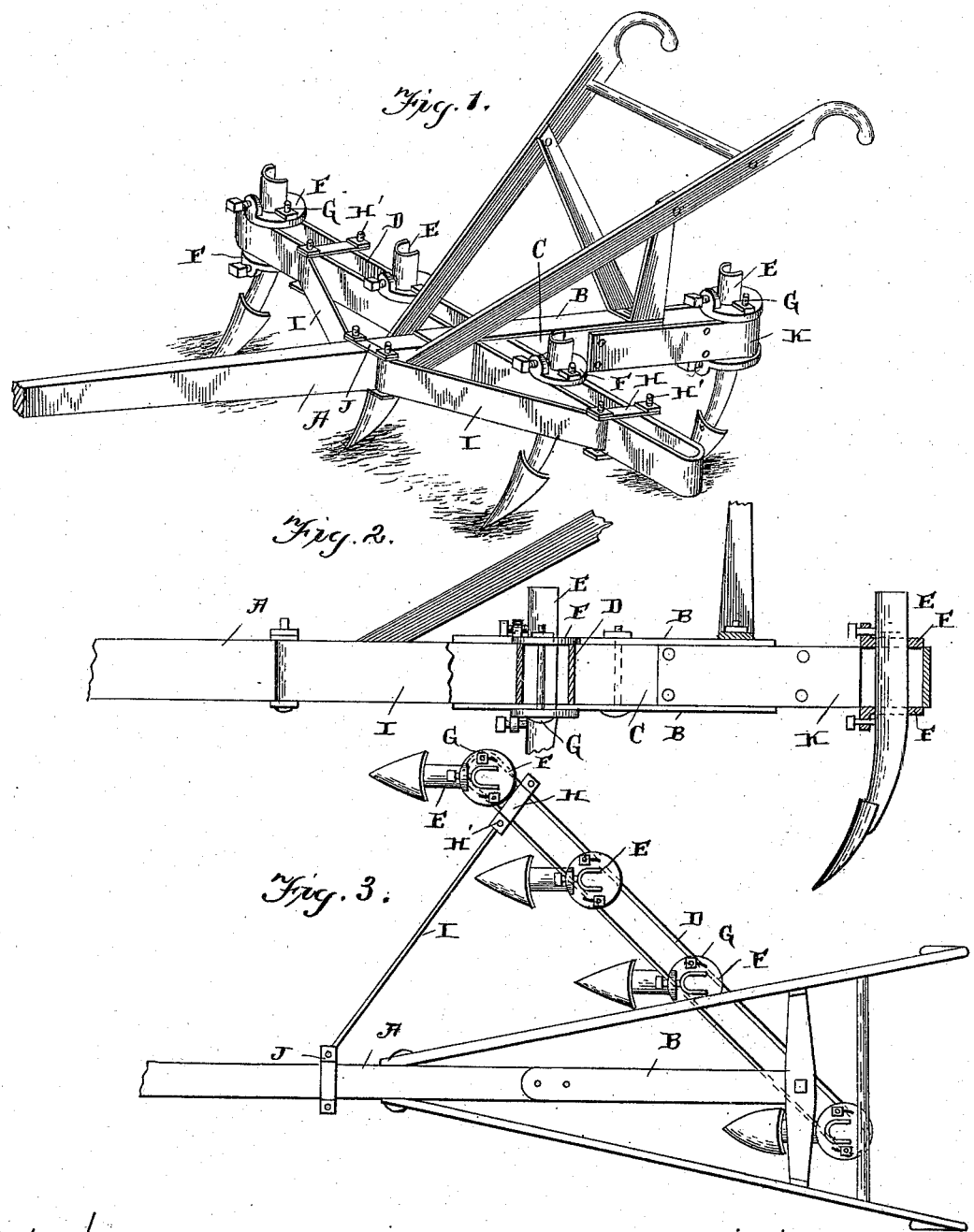

UNITED STATES PATENT OFFICE.

JOHN O. FORD, OF HOLLIS, TEXAS.

CULTIVATOR.

SPECIFICATION forming part of Letters Patent No. 535,690, dated March 12, 1895.

Application filed August 11, 1894. Serial No. 520,041. (No model.)

*To all whom it may concern:*

Be it known that I, JOHN O. FORD, of Hollis, in the county of Madison and State of Texas, have invented certain new and useful Improvements in Cultivators; and I do hereby declare the following to be a full, clear, and exact description of the invention, such as will enable others skilled in the art to which it pertains to make and use it, reference being had to the accompanying drawings, which form part of this specification.

My invention relates to an improved cultivator; and the object of the same is to provide an implement of simple construction and one easily and readily adjustable to the positions in which it may be used.

The invention consists in the novel features of constructions hereinafter fully described and claimed and illustrated in the accompanying drawings, in which—

Figure 1 is a perspective view of my improved implement. Fig. 2 is a side elevation of the same partly in section. Fig. 3 is a plan view showing one of the adjustments of which the implement is capable.

A designates the beam and projecting from its rear ends are the parallel bars B and secured between the outer ends of these bars is the block C, and between the said block and the beam end is a space through which extends the transverse cultivator bar D. The said cultivator bar is formed of flat metal which is bent into the form of a loop as shown. The cultivator shanks E are projected vertically through said beam and are held in the desired adjustment by means of plates F arranged on the upper and lower sides of the beam, the said plates being bound in position by clamping bolts G. By this arrangement the cultivator may be moved either toward or away from the beam as may be desired to most effectually accomplish the work in hand.

The clamping plates H extend across the upper and lower sides of the cultivator beam and are held together by bolts H', and the forward bolt upon each one of these clamps forms the loose or pivotal connection for the flat brace I which extends to the clamp J on the beam which in form is the same as that upon the cultivator beam and to which clamp J the flat brace is secured as at its opposite end. Thus it will be seen that the cultivator bar may be moved in either direction through the main beam of the implement to any desired distance, the clamps and braces adjusting themselves properly to all such movements.

One of the cultivator teeth is secured in position by strap K and when it is desired to adjust the cultivator to the position shown in Fig. 3 the block C and cultivator tooth are removed or detached from plates B and the bar D adjusted to the angle therebetween as in Fig. 3, and when so adjusted one of the side braces is dispensed with while the clamp on the cultivator beam is moved forward to accommodate itself to the forwardly extended position of the cultivator bar which as shown is at an angle to the said beam.

By means of the arrangement herein shown and described it will be seen that the implement is capable of a great variety of adjustments while the peculiar form of the clamp, the brace arm and the cultivator beam or bar renders the same very strong and durable, and at the same time capable of very ready adjustment.

Having thus fully described my invention, what I claim, and desire to secure by Letters Patent, is—

1. An improved cultivator comprising a beam, parallel bars extended from the rear end thereof, a block between the outer ends of the bars, a bar adjustably clamped between the said block the beam end and the said parallel bars, and cultivator teeth carried by said bar, substantially as shown and described.

2. An improved cultivator comprising a beam, a transversely adjustable bar carrying cultivator teeth, clamping plates above and beneath the said bar, bolts for securing them to the bar, braces having a loose or pivotal connection on the bolts, and an adjustable clamp on the cultivator beam to which the said braces are loosely connected, substantially as shown and described.

3. An improved cultivator comprising a beam, bars extended from the rear end thereof, a removable block between the outer ends of the bars, a transverse bar between the said block and the beam end, cultivator teeth carried by the said transverse bar, and a tooth secured to the said block, substantially as shown and described.

4. An improved cultivator comprising a beam, parallel plates extended from the rear end thereof, a bar adapted to be secured at one end between the outer end of the said parallel bars, and extended at an angle to the cultivator beam, and a brace for connecting the outer end of the said cultivator bar and the beam which is adjustable both on the bar and beam, substantially as described.

In testimony whereof I affix my signature in presence of two witnesses.

J. O. FORD.

Witnesses:
O. FORD,
J. C. IRGITT.